United States Patent

[11] 3,577,041

[72] Inventors Arne Kring;
 Arne Johansson, Vasteras, Sweden
[21] Appl. No. 805,758
[22] Filed Mar. 10, 1969
[45] Patented May 4, 1971
[73] Assignee Allmanna Svenska Elektriska Aktiebolaget
 Vasteras, Sweden

[54] OVERCURRENT RELAY CIRCUIT
 3 Claims, 1 Drawing Fig.
[52] U.S. Cl...................................... 317/148.5,
 317/33, 317/156
[51] Int. Cl...................................... H01h 47/32
[50] Field of Search............................ 317/33,
 (Inquired), 156, 148.5; 321/10; 333/79

[56] References Cited
UNITED STATES PATENTS
3,345,539 10/1967 Ashenden et al............ 317/33
3,363,144 1/1968 Carter......................... 317/33

Primary Examiner—James D. Trammell
Attorney—Jennings Bailey, Jr.

ABSTRACT: An overcurrent relay circuit, the pickup value of which is substantially independent of the DC-component in an asymmetrical alternating current, has an input transformer, the magnetic circuit of which is provided with air gaps while the secondary load of this transformer is high-resistive. To the secondary winding of the transformer is connected a rectifier with a smoothing device connected to level-sensing circuit and an output magnetic relay in the output circuit of the level-sensing circuit.

PATENTED MAY 4 1971
3,577,041
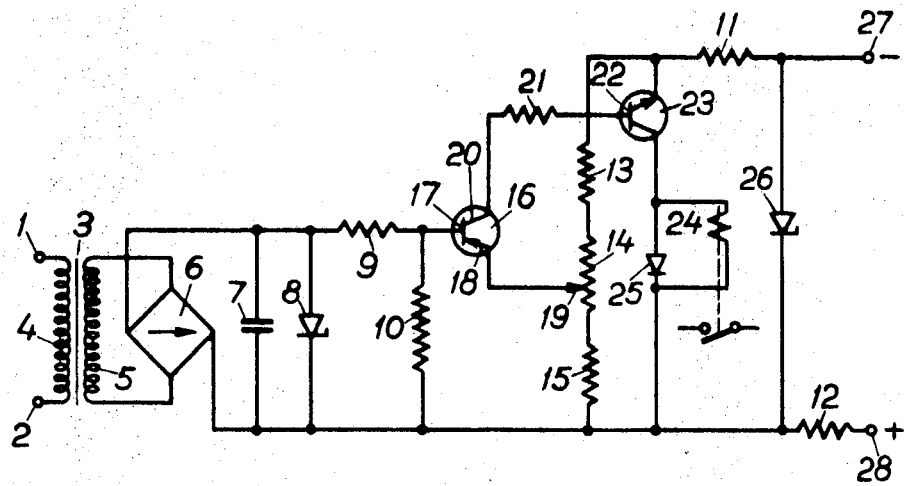
INVENTOR.
ARNE KRING
ARNE JOHANSSON
BY
Jennings Bailey Jr

OVERCURRENT RELAY CIRCUIT

BACKGROUND OF THE INVENTION

1. Field of the Invention

The invention relates to a relay circuit responsive to an overcurrent in an AC network.

2. Description of the Prior Art

In an AC network the short-circuiting current is often asymmetrical during the first periods after a short circuit because it contains a DC component. The magnitude of this component is dependent on the phase position of the voltage at the connection moment. At the most it can be as great as the top value of the AC component. The DC component is usually strongly damped and disappears rapidly, but it may influence instantaneous maximum current relay circuits so that they operate even if the effective value of the AC component, when the DC component has disappeared, is lower than the pickup value set for the relay circuit.

If the relay circuit is subjected to a short-circuiting current, the AC component being in the range between the pickup value set and the value at which the relay circuit operates at fully developed DC component, it will operate haphazardly dependent on the magnitude of the DC component. The greater this uncertain region is for a relay circuit, the more difficult it is to obtain good current selectivity.

SUMMARY OF THE INVENTION

The present invention relates to an overcurrent relay circuit, the pickup value of which is independent of the DC component in an asymmetrical alternating current, which relay circuit consists of an input transformer, a rectifier with a smoothing device connected to the secondary circuit of said transformer, a level sensing circuit and an output relay. The invention is seen from the accompanying claims.

BRIEF DESCRIPTION OF THE DRAWING

The accompanying drawing show a connection diagram for an overcurrent relay circuit according to the invention.

DESCRIPTION OF THE PREFERRED EMBODIMENT

The network to be supervised is connected to the terminals 1 and 2 on the primary winding 4 of the transformer 3. The secondary winding 5 is connected to a rectifier bridge 6. The magnetic circuit of the transformer is provided with air gaps which means that its magnetic impedance is low and predominantly inductive. Across the output of the rectifier bridge is a capacitor 7, a Zener diode 8 and a series-connection of two resistors 9 and 10. These two resistors must have high resistance so that the secondary load of the transformer will have high resistance. The low excitation impedance of the transformer means that a DC component which is superimposed on the alternating current, is to a great extend shunted away through said excitation impedance. On the secondary side only a momentary voltage impulse occurs and its influence can be almost entirely eliminated if the smoothing capacitor is chosen sufficiently large.

The Zener diode connected in parallel with the capacitor causes increased overload capacity for the relay circuit and also provides satisfactory protection against voltage transients. The relay circuit is connected to an auxiliary voltage U which may be 110 volt direct voltage. From this auxiliary voltage a stabilized voltage is taken out over the Zener diode 26. A voltage divider is connected to this voltage over two resistors 11 and 12. The voltage divider consists of a resistor 13, a potentiometer 14 and yet another resistor 15. The previously mentioned level sensing circuit consists of a transistor 16, the base electrode 17 of which is connected to one side of the capacitor 7 over the resistor 9. The emitter electrode 18 of the transistor is connected to the movable contact 19 of the potentiometer 14. The collector 20 of the transistor is connected over a resistor 21 to the base electrode 22 in a second transistor 23 which is connected by its emitter-collector circuit between the resistors 11 and 12 and thus connected to a source between the connections 27 and 28. The winding 24 of an output relay circuit is connected in the emitter-collector circuit of the transistor 23, parallel with a diode 25.

For the overcurrent relay circuit to be insensitive to DC components it is necessary for the secondary load on the transformer to have high resistance, which means that the resistors 9 and 10 must have high resistance and that the level-sensing circuit must have low power consumption. This is achieved with the level circuit shown having only static components.

The relay circuit works as follows:

When an overcurrent enters the primary winding of the transformer 3, the secondary voltage is full-wave rectified and is fed to the input of a two-step positive feedback direct current amplifier including the two transistors 16 and 23. The air-gap in the magnetic circuit has the result that a DC component in the overcurrent appears only as a very short voltage peak in the secondary circuit of the transformer and the charge of that short voltage peak is absorbed by the condenser 7. Thereby only the AC overcurrent enters the amplifier. When the input voltage to the amplifier exceeds the valve adjusted by contact 19 of the potentiometer 14, the current in the emitter-collector circuit of transistor 23 exceeds the pickup value of relay 24 and the relay trips.

We claim:

1. Overcurrent sensing circuit, the pickup value of which is independent of the DC component in asymmetrical alternating current, said circuit including an input transformer, a rectifier bridge connected to the secondary winding of the transformer, a first transistor the base electrode of which is connected to one output terminal of said rectifier bridge across a first resistor and to the second output of the rectifier bridge across a second resistor, a potentiometer, the emitter electrode of said first transistor being connected to the wiper arm of the potentiometer, one end of the wiper arm being connected to the second output of the rectifier bridge, a second transistor the base electrode of which is connected to the collector of the first transistor and having an emitter-collector circuit, and an output relay the winding of which is included in the emitter-collector circuit of the second transistor.

2. Overcurrent sensing circuit according to claim 1, said first and second resistors constituting the secondary load for the transformer, a smoothing capacitor and a Zener diode connected in parallel with said secondary load.

3. Overcurrent sensing circuit according to claim 1, a voltage-restricting element connected in parallel with the series-connection of the emitter-collector circuit and the winding of the output relay.

UNITED STATES PATENT OFFICE
CERTIFICATE OF CORRECTION

Patent No. 3,577,041　　　　　　　Dated May 4, 1971

Inventor(s) Arne Kring and Arne Johansson

It is certified that error appears in the above-identified patent and that said Letters Patent are hereby corrected as shown below:

After the Heading, insert:

Claims priority, Application Sweden, March 15, 1968, 3514/68

Signed and sealed this 12th day of June 1973.

(SEAL)
Attest:

EDWARD M. FLETCHER, JR.　　　　　ROBERT GOTTSCHALK
Attesting Officer　　　　　　　　Commissioner of Patent